United States Patent [19]

Ballewski et al.

[11] Patent Number: 5,391,341
[45] Date of Patent: Feb. 21, 1995

[54] PROCESS AND BINDER FOR THE MANUFACTURE OF CERAMIC SHELLS FOR USE AS MOLDS

[75] Inventors: Heinrich Ballewski, Wittrahmsweg 39, D-4133 Neukirchen-Vluyn; Herbert Graf, Eichsenstrasse 190, D-4130 Moers 1; Wolfgang Grossmann, Boscheideweg 40, D-4130 Moers 2, all of Germany

[73] Assignees: Heinrich Ballewski, Neukirchen-Vluyn; Herbert Graf; Wolfgang Grossmann, both of Moers, all of Germany

[21] Appl. No.: 820,869

[22] PCT Filed: Jun. 28, 1991

[86] PCT No.: PCT/EP91/01217

§ 371 Date: Jan. 17, 1992

§ 102(e) Date: Jan. 17, 1992

[87] PCT Pub. No.: WO92/12813

PCT Pub. Date: Aug. 6, 1992

[30] Foreign Application Priority Data

Jan. 19, 1991 [DE] Germany .............................. 4101501
May 22, 1991 [DE] Germany .............................. 4116609

[51] Int. Cl.$^6$ .......................................... B29C 67/00
[52] U.S. Cl. ............................... 264/113; 264/63; 264/220; 264/225; 264/305; 164/518
[58] Field of Search ................. 264/113, 63, 220, 225, 264/305; 164/516, 517, 518

[56] References Cited

U.S. PATENT DOCUMENTS

| | | | |
|---|---|---|---|
| 3,005,244 | 10/1961 | Erdle et al. | 22/129 |
| 3,126,597 | 3/1964 | Operhall | 22/215 |
| 3,165,799 | 1/1965 | Watts | 22/196 |
| 3,196,506 | 7/1965 | Operhall et al. | 164/516 |
| 3,745,139 | 7/1973 | Kachur | 260/38 |
| 3,752,689 | 8/1973 | Moore | 106/38.3 |
| 3,859,153 | 1/1975 | Beyer | 161/182 |
| 3,894,572 | 7/1975 | Moore, Jr. | 164/26 |
| 3,898,313 | 8/1975 | Taylor | 264/225 |
| 3,933,190 | 1/1976 | Fassler | 164/26 |
| 5,159,970 | 11/1992 | Burkarth | 164/517 |

FOREIGN PATENT DOCUMENTS 2107640 5/1972 France .
2519309 11/1975 Germany .

OTHER PUBLICATIONS

Derwent, Preparation Cast Model Shape Relief Coating . . . p. 2 Oct. 22, 1991.

*Primary Examiner*—Mary Lynn Theisen
*Attorney, Agent, or Firm*—McGlew and Tuttle

[57] ABSTRACT

For the manufacture of quickly drying dip coats whose drying time is comparable to the drying time of shells produced on the basis of alcoholic binders, the process uses as a binder for the dip a dispersion of aqueous colloidal silica sol to which synthetic high polymers and/or an emulsion from the group of silicon-organic compounds is formed which after drying is impermeable to water but permeable to water vapor.

15 Claims, No Drawings

PROCESS AND BINDER FOR THE MANUFACTURE OF CERAMIC SHELLS FOR USE AS MOLDS

FIELD OF THE INVENTION

The invention relates to a process for the manufacture of ceramic shells for use as molds in which
a) a fusible or removable pattern of a part to be cast is produced,
b) the pattern is dipped in a slurry of refractory material and a binder which contains a colloidal, aqueous silica sol and polymers to form a wet coating the pattern,
c) a coarse, refractory powder is sprinkled onto the coat,
d) the coat is dried,
e) the steps b), c) and d) are repeated until the shell has obtained the desired thickness.

The invention also relates to a binder in the above process.

BACKGROUND OF THE INVENTION

In such a process, pattern clusters of wax or a similar material are provided with a solid ceramic layer with a thickness of a few millimeters by applying several dip coats. The individual layers, after having been applied, are dried or hardened separately. On each individual wet dip coat a coarse, refractory powder or sand is scattered as a binding agent for the following dip coat. Following dewaxing the shells are fired and can then be used for casting whilst still hot or after cooling down.

Processes of the type described above which use aqueous binders are limited in their use in that, contrary to alcoholic binders, aqueous binders require a very extended drying process and, ultimately, had to be subjected to suitable vacuum drying to obtain complete dryness. It has been tried to overcome these problems by mixing alcohol, e.g. isopropanol, into the aqueous binder. The alcohol replaced part of the water and had the characteristic feature to evaporate quicker than water. However, the water alcohol mixture was unable to prevent, during the subsequent dipping operations, the water/alcohol mixture from penetrating again into the previously applied and already dried coat, so that with progressive dipping ever increasing drying times were required. Other methods were also tried to solve the pertinent problems.

From the U.S. Pat. No. 3,005,244 it is known to add to a 30% aqueous silica sol binder with a quantity of resinous polymers so that the solid content of the resulting binder consists of 60 to 80% by weight of $SiO_2$ and 8 to 35% by weight of resinous polymer. Ceramic shells which are produced with this binder have, among other things due to the addition of the polymers, an increased green strength of the shell which is said to permit fusion of the wax from the shell without the intermediate use of an autoclave.

The U.S. Pat. No. 3,126,597 describes a ceramic shell with an aqueous binder based on silicic acid (30% by weight), to which water is added for dilution and to which sodium fluoride is added for accelerating the sol/gel reaction. The sodium fluoride leads merely to a quicker hardening of the individual ceramic layers applied but does not prevent penetration of the aqueous binder into the previously applied ceramic layers during the subsequent dipping operations. This binder combination requires long drying times and, in the case of shells with a higher number of layers, ultimately vacuum drying.

The U.S. Pat. No. 3,165,799 describes a triple dipping process for the manufacture of a ceramic shell for multiple-core investment castings in which the first ceramic dip layer is applied with an aqueous binder with subsequent sanding. Following this, a second ceramic dip layer with aqueous binder, to which 0.5 to 2% by weight of polyvinylalcohol has been added, is applied without sanding or stuccoing. Thereafter, a third ceramic dip layer with aqueous $SiO_2$ binder with 0.5 to 2% by weight of polyvinyl alcohol is applied under vacuum with finish sanding or stuccoing. The aforementioned dipping sequence has the advantage of permitting the manufacture of investment castings with core parts which can otherwise only be manufactured with ceramic cores.

From the U.S. Pat. No. 3,752,689 the manufacture of a ceramic shell by a rapid process with an aqueous binder with 26.4% by weight of $SiO_2$ and 4.2% by weight of $Al_2O_3$ is known, with the aforementioned binder being converted from the sol state into the gel state by respectively organic and inorganic bases. This process permits applying the individual ceramic layers relatively quickly but has the disadvantage that each ceramic layer is infiltrated by the aqueous binder subsequently applied layer, and that lengthy final drying, including vacuum drying, has to be performed.

The idea is to discharge the acid $SiO_2/Al_2O_3$ sol which is positively charged, by negatively charged particles of organic and inorganic bases.

The U.S. Pat. No. 3,859,153 also describes a rapid process for the manufacture of a ceramic shell in which an aqueous binder with negatively charged colloidal particles is discharged, and thus hardened, by an aqueous sol with positively charged colloidal particles. This process, too, also permits quickly applying the individual ceramic layers but has the disadvantage that the discharge of the negatively charged sol by the positively charged sol applied may already take place in the immersion tank. Another disadvantage of this process is that the shell manufactured by it has to be subjected to a respectively long final drying process. Still another disadvantage is that as a result of the repeated infiltration during dipping with an aqueous binder, the shells become so heavy that there is the risk of breakage. Subsequent vacuum drying is indispensable for economic reasons.

The U.S. Pat. No. 3,894,572 describes a manufacturing process for a ceramic shell with a positively charged aqueous binder which is hardened by the sanding material which contains negatively charged colloidal particles. The disadvantage are the same as those described for the aforementioned two rapid processes.

The U.S. Pat. No. 3,933,190 describes a process for the manufacture of a pure $Al_2O_3$ shell for directional solidification. The ceramic shell is prepared with 15 to 25 parts of an aqueous solution which contains 15% by weight of aluminum polyoxychlorid, 6 to 10 parts of water and 8 to 14 parts of latex. To this fluid $Al_2O_3$ powder is added as a filler. For pH control of the binder, 0.5 to 1.5 parts of a 2% aqueous HLC solution are added. In this case the function of the latex added is to increase the green strength of the ceramic layers applied. All disadvantages described for the rapid process are relevant in the case of this shell, too.

SUMMARY AND OBJECTS OF THE INVENTION

It is the aim of the invention to propose a process and binders of the type described above by which quickly drying shells can be manufactured with the drying time being comparable with the drying time of shells which are manufactured on the basis of alcoholic binders.

This aim is solved in that a Back-up-Dip and the binder contain a dispersion of an aqueous colloidal silica sol to which are added synthetic high polymers and/or an emulsion from the group of silicon organic compounds. This causes a coat or film to be formed which after drying is impermeable to water but permeable to water vapour.

When high polymers and in particular high polymers with hydrophobizing and/or hydrophobic character are used, a film is formed within the dip layer, also called back-up layer, which although impermeable to water is permeable to water vapour and permits thus finish drying or secondary drying of the ceramic layers which form the shell. When a new dip layer is applied the binder of the subsequently applied wet dip layer cannot penetrate into the already dried or partially dried and sanded dip layer. Drying of the still humid drip layers can be performed in the usual way, if necessary with the assistance of fans. The green strength of the ceramic shells manufactured by this process is just as satisfactory as the strength after firing or burning. Shell defects by fissures of thermal cracks in the castings are not noted.

DETAILED DESCRIPTION OF THE PREFERRED EMBODIMENTS

By properly proportioning the synthetic high polymers, and/or an emulsion from the group of the silicon organic compounds with respect to the aqueous silica sol, and also by a variation of the refractory material used as a filler, the Back-up Dip can be adapted to the respective conditions or requirements. In this connection, one proposal of the invention suggests for the binder to contain 2 to 20% by volume, in particular 14 to 18% by volume, of synthetic high polymers. Another proposal suggests that the binder contains 2 to 20% volume, in particular 3 to 7% by volume, of a synthetic high polymer to which are added 0.2 to 20% by weight, referred to the weight of the synthetic polymer, of an emulsion from the group of the silicon-organic compounds.

It has also been found to be very convenient to use an emulsion of the group of the silicon-organic compounds with droplet sizes <200 nm. In addition, the aqueous colloidal silica sol can contain 0 to 20% by weight of the total water content of the binder, in particular 0.005 to 15% by weight of an emulsion of the group from the silicon-organic compounds.

It is also possible to add a surfactant or surface tension-reducing agent to the binder, in particular in a quantity of 0.08% by volume, referred to the volume of the dip-coat mass. The surfactant assists the uniform distribution of colloidal silica sol, high polymer and/or an emulsion from the group of silicon-organic compounds, and improves the wettability of the dip-coat mass without affecting the silica sol, the high polymers and/or the emulsion from the group of the silicon-organic compounds.

To prevent segregation of the colloidal silica sol and the high polymers in the case of the long storage times it may be of an advantage to prepare the dispersion of aqueous silica sol and synthetic high polymers and to process it into the dip-coat mass only shortly before it is used.

A high polymer which possesses the desired properties has the following characteristic data:

| | |
|---|---|
| Solids | 50 +/− 1% by weight |
| Viscosity at 20° C. (D = 57⁻¹) | 800 to 1500 mPa · s |
| pH-value | 7.0 to 8.5 |
| Density | approx. 1.02 g/ccm |
| Film condition | viscoplastic, waterproof, alkaliproof or alkali-resistant |

An emulsion of the above mentioned silicon-organic compounds which possesses the desired properties has the following characteristic data:

| | |
|---|---|
| Quantity of solids | 52 to 57% by weight |
| Viscosity | 25 mPa · s |
| Density | approx. 1 g/ccm |
| Solvent | water |
| pH-value | 7 to 9 |

In the following, the invention is described on the basis of application examples:

Characteristic data of the process according to the invention:

| | |
|---|---|
| Binder | approx. 30% of colloidal silica sol or other aqueous colloidal silica sols |
| Deluting agent: | deionised water, if required |
| High polymer as film forming agent: | e.g. aqueous high-polymer dispersion with hydrophobic making character and/or hydrophobic character and/or emulsion from the group of silicon-organic compounds |
| Filler: | Filler is the ceramic refractory material which is mixed into the colloidal silica-sol binder with the addition of high polymers and/or an emulsion from the group of silicon-organic compounds, in order prepare the dip. It consists of approx. 45% by weight of fused silica - 12 mesh to <350 mesh, approx. 45% by weight and approx. 10% by weight of zircon silica 350 mesh |
| Stuccoing material for the 1st and 2nd layer: | zircon-silica sand |
| Stuccoing material for the 3rd layer: 3rd layer = 1st back-up layer | aluminum silica |
| Stuccoing material for the 4th and all following layers: | mixture of 50% mullite and 50% aluminum silicate grain size 0.3 to 1.0 mm |

1st EXAMPLE

In a mixing vessel of 600 mm diameter and 650 mm height the following back-up dip was prepared:

| | | |
|---|---|---|
| 1. | Binder | 41.5% by weight = 94 kg |
| 2. | Filler | 58.5% by weight = 132 kg |
| 3. | Total quantity Back-up dip | 141 l = 226 kg |
| 4. | The 94 kg of binder, corresponding to 82 l, consist of: | |

-continued

| | |
|---|---|
| 56 l of aqueous colloidal 30% silica sol | |
| 13 l of deionished water | |
| 13 l of high polymer | |
| 5. The 132 kg of filler consists of: | |
| 59.5 kg of fused silica powder | <350 mesh |
| 59.5 kg of mullite powder | 150 mesh |
| 13 kg of zircon powder | 350 mesh |

The resulting Zahncup No. 2 viscosity of the back-up dip was 22 sec. By increasing the filler quantity to 63% by weight the Zahncup No. 2 viscosity was increased to 37 sec. and was thus within the range of the rated viscosity of 33 to 41 sec.

Wax clusters from production and 2 clusters of bending specimens were provided, as usual, with the 1st and 2nd dip coat and then immersed into the back-up of the above described composition as follows:

1. Immersion of the 1st back-up layer into the back-up dip and stuccoing by hand with aluminum silicate, grain size 0.3 to 0.5 mm.
2. Drying of the back-up dip-coat applied 2.5 to 3 hours.
3. Immersion for the 2nd back-up layer into the back-up dip and stuccoing by hand with 50% aluminum silicate and 50% mullite, grain size 0.3 to 1 mm.
4. Drying same as under 2.
5. 3rd, 4th and 5th back-up layer same as under 3. and 4. This means that the shells were completed in a 2-shift operation.

The relative humidity was 50±5% and the ambient temperature 23°±1° C. Drying was performed partially with fan assistance.

The resulting multiple-core castings were of very good quality. The following average bending strength values were measured on ceramic flat specimens:

| Condition of the ceramic flat specimens | σ BB: |
|---|---|
| Green | 349 N/cm² |
| Fired | 309 N/cm² |
| Fired and redipped | 400 N/cm² |

2nd EXAMPLE

In a production mixing vessel the following back-up dip was prepared:

| | | |
|---|---|---|
| 1. | Binder | 37% by weight = 423 kg |
| 2. | Filler | 63% by weight = 720 kg |
| 3. | Total quantity of the back-up | 630 l = 1143 kg |
| 4. | The 423 kg of binder, corresponding to 367 l, consist of | |
| | 251 l of aqueous colloidal 30% silica sol | |
| | 58 l of deionished water | |
| | 58 l of high polymer | |
| 5. | The 720 kg of filler consist of: | |
| | 327.5 kg of fused silica powder | <350 mesh |
| | 327.5 kg of mullite powder | 150 mesh |
| | 65 kg of fused silica | 350 mesh |

The pH-valve of the finished back-up ranged between 9 and 10 units. The actual viscosity was within the range of the rated viscosity, i.e. between 33 and 21 sc. according to Zahncup 2. The theoretical quantity of solids of colloidal SiO₂ in the binder was calculated to be 21.5%.

The theoretical quantity of solids of high polymers in the binder was calculated to be approx. 7%. The total quantity of solids of colloidal SiO₂ and high polymer in the binder was approx. 28.5 %.

Relative humidity inside the dipping-room 50±5%. Temperature inside the dipping-room 23°±1° C.

Drying time between individual back-up layers 2.5 to 3 hours.

After the application of the 1st and 2nd dip the following dipping cycle was adhered to by means of a robot:

1. Immersion for the 1st back-up layer into the back up dip and stuccoing by means of a robot with aluminum silicate, grain size 0.3 to 0.5 mm.
2. Drying of the back-up layer applied 2.5 to 3 hours.
3. Immersion for the 2nd back-up layer into the back-up dip and stuccoing by means of a robot with 50% of aluminum silicate and 50 % of mullite, grain size 0.3 to 1 mm.
4. Drying same as under 2.
5. 3rd, 4th and 5th back-up layer same as under 3. and 4.

The respective shells were produced in a 2-shift operation. A total of 1.334 clusters were produced.

The following average bending strength values (σ BB) were measured on ceramic flat specimens:

| Condition of the ceramic flat specimens | σ BB |
|---|---|
| Green | 450 to 660 N/cm₂ |
| Fired | 480 to 660 N/cm₂ |
| Fired | 590 to 870 N/cm₂ |

3rd EXAMPLE

In a production mixing vessel the following back-up dip was prepared:

| | | |
|---|---|---|
| 1. | Binder | 36% by weight = 434.8 kg |
| 2. | Filler | 64% by weight = 737.7 kg |
| 3. | Total quantity of the back-up dip | 636.7 l = 1172.5 kg |
| 4. | The 360.2 l of binder consist of: | |
| | 247 l of aqueous colloidal 30% silica sol | |
| | 57.2 l of deionished water | |
| | 56 l of high polymer | |
| 5. | The 737.7 kg of filler consist of: | |
| | 335.3 kg of fused silica powder | <120 mesh |
| | 335.3 kg of mullite powder | 130 mesh |
| | 67.1 kg of zircon silicate | 350 mesh |

The pH-Value of the finished back-up dip ranged between 9 and 10 units. The actual viscosity was within the range of the rated viscosity which, for reasons of production, had been changed in the meantime, i.e. between 28 and 36 sec. according to Zahncup 2. The total quantity of solids of colloidal SiO and high polymer in the binder was approx. 28.25 %.

Relative air humidity inside the dipping room 50±5%. Temperature inside the dipping room 23°±1° C. Drying time between individual back-up layers=2.5 to 3 hours.

After the application of the 1st and 2nd dip the following dipping cycle was adhered by means of a robot:

1. Immersion for the 1st back-up layer into the back-up dip and stuccoing by means of a robot with aluminum silicate, grain size 0.3 to 0.5 mm.
2. Drying of the back-up layer applied 2.5 to 3 hours.
3. Immersion for the 2nd back-up layer into the back-up dip and stuccoing by means of a robot with 50% of aluminum silicate and 50 % of mullite, grain size 0.3 to 1.0 mm.
4. Drying same as under 2.
5. 3rd, 4th and 5th back-up layer same as under 3. and 4.

The respective shells were produced in a 2-shift operation. A total of 333 clusters were produced.

The following average binding strength values ($\sigma$ BB) were measured on ceramic flat specimens:

| Condition of the ceramic flat specimens | $\sigma$ BB: |
| --- | --- |
| Green | 417 N/cm$^2$ |
| Fired | 582 N/cm$^2$ |
| Fired and redipped | 696 N/cm$^2$ |

4th EXAMPLE

In a production vessel of 600 mm diameter and 630 mm height the following back-up dip was prepared:

| | | |
| --- | --- | --- |
| 1. | Binder | 36% by weight = 73.7 kg |
| 2. | Filler | 64% by weight = 130.9 kg |
| 3. | Total quantity of the back-up dip | 113 l = 204.6 kg |
| 4. | The 73.7 kg, corresponding to 61.6 l, consist of: | |
| | 58.7 l of aqueous colloidal 30% silica sol | |
| | 2.9 l of high polymer with addition agent | |
| 5. | The 130.9 kg of filler consists of: | |
| | 59.5 kg of fused silica powder | −120 mesh |
| | 59.5 kg of mullite powder | 150 mesh |
| | 11.9 kg of zircon silicate | 350 mesh |

The resulting Zahncup No. 2 viscosity was 43 sec. By reducing the filler quantity to approx. 61 % by weight the Zahncup No. 2 viscosity was reduced to 36 sec. and was thus within the range of the rated viscosity of 28 to 36 sec.

Wax clusters from production and 2 clusters of bending specimens were provided, as usual, with the 1st and 2nd dip coat and then immersed into the back-up dip of the above described composition as follows:

1. Immersion for the 1st back-up layer into the back-up dip and stuccoing with 50% aluminum silicate grain size 0.3 to 0.5 mm, by hand.
2. Drying of the back-up layer applied 2.5 to 3 hours.
3. Immersion for the 2nd back-up layer into the back-up dip and stuccoing by hand with 50% aluminum silicate and 50% mullite, grain size 0.3 to 1 mm.
4. Drying same as under 2.
5. 3rd, 4th and 5th back-up layer same as under 3 and 4. This means that the shells were completed in a 2-shift operation.

The relative humidity was 50±5% and the ambient temperature 23°±1° C.

Drying was performed partially with fan assistance.

The resulting multiple-core castings were of very good quality. The following average bending strength values were measured on ceramic flat specimens:

| Condition of the ceramic flat specimens | $\sigma$ BB: |
| --- | --- |
| Green | 366 to 394 N/cm$^2$ |
| Fired | 558 to 684 N/cm$^2$ |
| Fired and redipped | 725 to 807 N/cm$^2$ |

5th EXAMPLE

In a production mixing vessel the following back-up dip was prepared:

| | | |
| --- | --- | --- |
| 1. | Binder | 37% by weight = 426 kg |
| 2. | Filler | 63% by weight = 726 kg |
| 3. | Total weight of the back-up dip | 637 = 1152 kg |
| 4. | The 426 kg of binder, corresponding to 360 l, consist of: | |
| | 331 l of aqueous colloidal 30% silica sol | |
| | 29 l of an emulsion of a silica-organic compound | |
| 5. | The 726 kg of filler consist of: | |
| | 330 kg of fused silica powder | <120 mesh |
| | 330 kg of mullite powder | 150 mesh |
| | 66 kg of zircon powder | 350 mesh |

The pH-value of the finished back-up dip ranged between 9 and 10 units. The actual viscosity was within the range of the rated viscosity, i.e. between 24 and 28 sec. according to Zahncup 2. The relative air humidity inside the dipping room was 50±5%. Temperature inside the dipping room: 23°±1° C. Drying time between individual back-up layers: 2.5 to 3 hours.

After the application of the 1st and 2nd dip-coat the following dipping cycle was adhered to by means of a robot.

1. Immersion for the 1st back-up layer into the back-up dip and stuccoing by means of a robot with aluminum silicate, grain size 0.3 to 0.5 mm.
2. Drying of the back-up layer applied 2.5 to 3 hours.
3. Immersion for the 2nd back-up layer into the back-up dip and stuccoing by means of a robot with 50% aluminum silicate and 50% mullite, grain size 0.3 to 1.0 mm.
4. Drying same as under 2.
5. 3rd, 4th and 5th back-up layer same as under 3. and 4. above.

The respective shells were produced in a 2-shift operation.

The following average bending strength values ($\sigma$ BB) were measured on ceramic flat specimens:

| Condition of the ceramic flat specimens: | $\sigma$ BB: |
| --- | --- |
| Green | 400 to 600 N/cm$^2$ |
| Fired | 470 to 690 N/cm$^2$ |
| Fired and redipped | 620 to 750 N/cm$^2$ |

While specific embodiments of the invention have been shown and described in detail to illustrate the application of the principles of the invention, it will be understood that the invention may be embodied otherwise without departing from such principles.

What we claim is:

1. A process for preparing ceramic shells for use as casting molds, the process comprising the steps of:
   a) preparing a pattern of the part to be cast;
   b) dipping said pattern into a slurry of refractory material and binder, said binder containing a colloidal, aqueous silica sol, and an emulsion from the group consisting of silicon-organic compounds to form a wet coating on the mold which after drying forms a dry coating that is substantially impermeable to liquid water and substantially permeable to water vapor, said aqueous colloidal silica SOL contains 0.005% to 20% by weight of the total water content of the binder of said emulsion from the group of silicon organic compounds;
   c) spraying a coarse refractory powder onto said wet coating;
   d) drying the wet coating;
   e) repeating steps b), c) and d) until a ceramic shell of desired thickness has be created.

2. A process for preparing ceramic shells for use as casting molds, the process comprising the steps of:
   a) preparing a pattern of the part to be cast;
   b) dipping said pattern into a slurry of refractory material and binder, said binder containing a colloidal, aqueous silica sol, polymers and synthetic high polymers to form a wet coating on the mold which after drying forms a dry coating that is substantially impermeable to liquid water and substantially permeable to water vapor, said high polymer having one of hydrophobizing character and hydrophobic character and said binder contains 2 to 20% by volume of said synthetic high polymers;
   c) spraying a coarse refractory powder onto said wet coating;
   d) drying the wet coating;
   e) repeating steps b), c) and d) until a ceramic shell of desired thickness has be created.

3. Process according to claim 1, wherein:
   said emulsion from said group of silicon-organic compounds has droplet sizes of <200 nm.

4. Process according to 2, wherein:
   said binder contains 2 to 20% by volume of said synthetic high polymer and 0.2 to 20% by weight, referred to a weight of said synthetic polymer, an emulsion from a group consisting of silicon-organic compounds.

5. Process according to one of claims 1 and 2, wherein:
   a surfactant is added to said binder.

6. Process according to claim 5, wherein:
   said surfactant is added in a quantity of 0.08% by volume, referred to a volume of said slurry.

7. Process according to claim 2, wherein:
   said aqueous silica sol and said synthetic high polymer is prepared and processed into said slurry only shortly before the slurry is used is used.

8. Process according claim 2, wherein:
   said high polymer has characteristics of:

| | |
|---|---|
| Solids | 50 +/− 1% by weight |
| Viscosity at 20° C. (D = 57$^{-1}$) | 800 to 1500 mPa · s |
| pH-value | 7.0 to 8.5 |
| Density | approx. 1.02 g/ccm |
| Film condition | viscoplastic, waterproof, [alkaliproof] alkali-resistant |

9. Process according to claim 1, wherein:
   said emulsion of the group of the silicon-organic compounds has characteristics of:

| | |
|---|---|
| Quantity of solids | 52 to 57% by weight |
| Viscosity | 25 mPa · s |
| Density | approx.1 g/ccm |
| Solvent | water |
| pH-value | 7 to 9 |

10. A process in accordance with claim 2, wherein:
    said binder contains 14% to 18% by volume of said synthetic high polymers.

11. A process in accordance with claim 1, wherein:
    said aqueous colloidal silica sol contains 0.005% to 20% by weight of the total water content of the binder, and 0.005% to 15% by weight of said emulsion from the group of the silicon organic compounds.

12. A process in accordance with claim 2, wherein:
    said binder contains 3% to 7% by volume, of said synthetic high polymer and 0.2% to 20% by weight, referred to a weight of said synthetic polymer, of an emulsion from a group consisting of silicon-organic compounds.

13. A process according to claim 1, wherein:
    said dipping of said pattern into said slurry is performed before segregation of said aqueous silica sol and said emulsion.

14. A process according to claim 2, wherein:
    said dipping of said pattern into said slurry is performed before segregation of said aqueous silica sol and said synthetic high polymers.

15. A process according to claim 1, wherein:
    said emulsion from said group of said silicon-organic compounds has one of a hydrophobizing character and a hydrophobic character.

* * * * *